Figure 1:
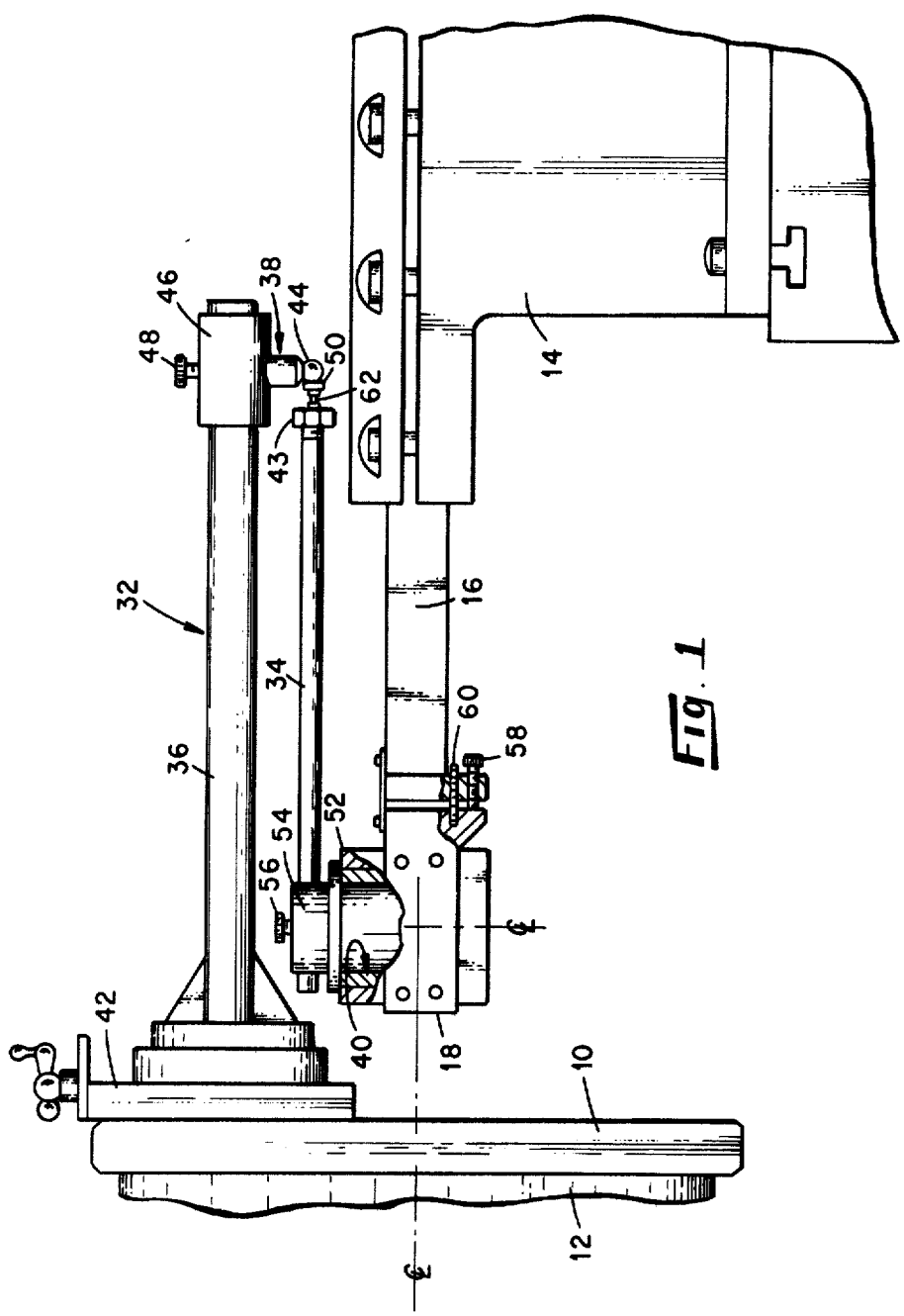

United States Patent [19]

Thompson et al.

[11] 3,886,666

[45] June 3, 1975

[54] APPARATUS FOR MEASURING TOOL PATH ACCURACY

[75] Inventors: Charles H. Thompson, Oak Ridge; Fred W. Jones, Concord, both of Tenn.

[73] Assignee: The United States of America as represented by the United States Energy Research and Development Administration, Washington, D.C.

[22] Filed: July 20, 1973

[21] Appl. No.: 381,203

[52] U.S. Cl. ............................................. 33/174 P
[51] Int. Cl. ............................................. G01b 5/20
[58] Field of Search ........ 33/174 P, 174 PC, 174 Q, 33/174 PA, 169 R, 185 R, 1 BB

[56] References Cited
UNITED STATES PATENTS

| | | | |
|---|---|---|---|
| 3,206,857 | 9/1965 | Kaye | 33/174 PC |
| 3,221,413 | 12/1965 | Fesser | 33/174 P |
| 3,781,999 | 1/1974 | Colangelo | 33/185 R |

*Primary Examiner*—Richard E. Aegerter
*Assistant Examiner*—Willis Little
*Attorney, Agent, or Firm*—John A. Horan; David S. Zachry; Earl L. Larcher

[57] ABSTRACT

An apparatus for dynamically checking the accuracy of the tool path of a numerically controlled machine tool while following an inner or outer contour of an orbicular part defined by a true radius is described. A mechanical coupling joins the tool holder to the face plate of the machine spindle. As the machine tool is then directed through its cutting program deviations in the path of the cutting tool from a path defining a true radius changes the effective length of the mechanical coupling with such changes being measured by means associated with the mechanical coupling.

7 Claims, 3 Drawing Figures

APPARATUS FOR MEASURING TOOL PATH ACCURACY

The present invention relates generally to machine tools wherein the path of the cutting tool is checked for accuracy, and more particularly to an apparatus for use with automated machine tools for providing a dynamic check of the actual tool path as directed by a control program with respect to the path required for following a true radius contour. This invention was made in the course of, or under, a contract with the U.S. Atomic Energy Commission.

Precision machine tools such as lathes or the like often employ a programmed control mechanism such as a numerical control unit or a template tracing system for essentially fully automating the functions of the machine, including the positioning of the machine tool, during machining operation. Such control mechanisms are practical where effective part reproducibility is desired, especially parts of contoured configuration. when using programmed machines it is desirable to determine how accurately the machine performs the commands of the program prior to and periodically during a part-production run or for insuring that the program will direct the machine to provide the parts of the desired geometry within predetermined tolerances.

One well-known procedure for verifying or checking the programed performance of the machine and the accuracy of the latter has involved the use of a template of the geometry and desired size of the part as it would be at the finish of the programmed machining operation or at the end of a particular programmed phase of the latter. With this template secured to the machine in place of the part and a measuring means such as a linear variable differential transformer (LVDT) affixed to the tool holder the machine is directed through its program. As the machine progresses through the motions dictated by the program the spatial differences between the path traveled by the tool and the contour of the template are sensed by the measuring means and recorded by employing a strip chart recorder or other suitable recording means. However, while this technique provides results considerably better than a trial and error process some shortcomings and drawbacks are encountered. For example, the preparation of templates of the desired size with essentially no dimensional errors has proven to be very difficult. The placement of the template in the proper position on the machine has also proven to be a formidable task. Further, when employing an LVDT for measuring the variances between the tool path defined by the template and actual tool path, the LVDT is not always perpendicular to the contour being traced so as to necessitate corrections in the LVDT output.

Accordingly, it is the aim or primary objective of the present invention to provide a substantial amelioration over previously known techniques and systems utilized for checking the tool-path accuracy of machine tools guided by predetermined programs through contours of uniform radii. This goal is achieved by mechanically coupling the face plate of the machine spindle to the tool holder with the longitudinal axis of at least a portion of the coupling extending through a projection of the pivotal axis of the tool when supported by the tool holder. A measuring mechanism is incorporated in the mechanical coupling to sense any changes in the effective length of the coupling as the tool is directed through its programmed path. An output indicative of such changes is directed to a suitable mechanism for recording deviations of the tool path from generating an arc having a common or true radius.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. For example, while the description below is directed to a lathe wherein the carriage for the cutting tool travels along the X-axis and the spindle travels along the Y-axis it is to be understood that a lathe wherein the tool carriage is adapted for translational movement in both directions may employ the apparatus of the present invention.

Figure 2:
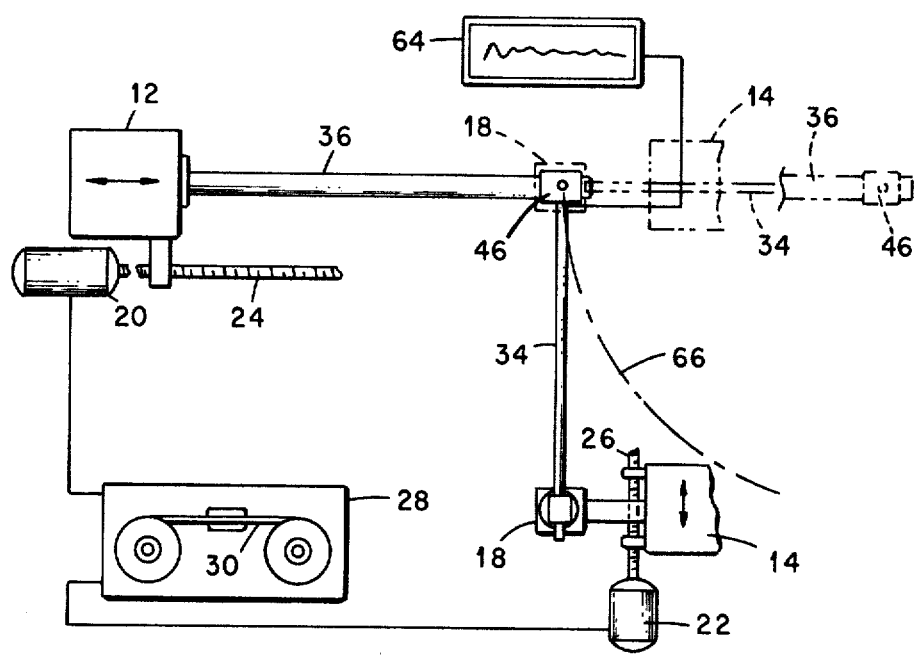
Figure 2:
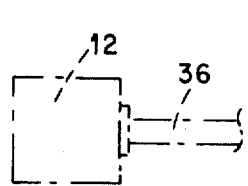
Figure 3:
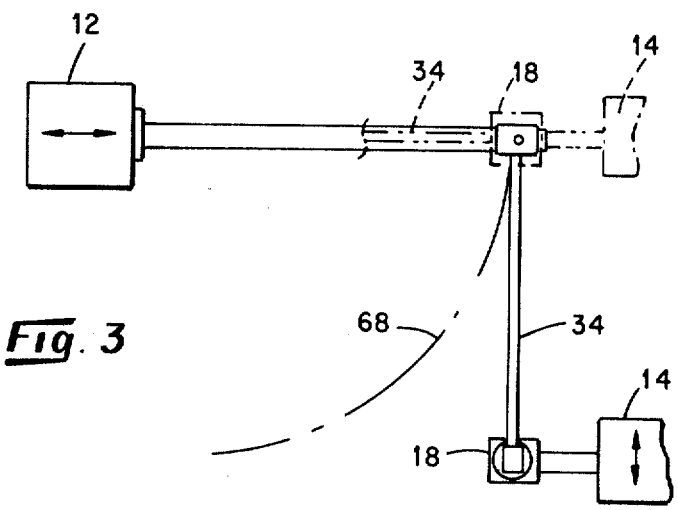

In the accompanying drawings:

FIG. 1 is an elevational view of a preferred embodiment of the present invention showing construction details of the tool path measuring mechanism;

FIG. 2 is a schematic plan view of FIG. 1 illustrating operational details of the FIG. 1 embodiment with respect to measuring the tool path accuracy while generating an arc defining an inner contour of an orbicular structure; and FIG. 3 is a schematic plan view somewhat similar to FIG. 2 but showing the measurement of the tool path accuracy while generating an arc defining an outer contour of an orbicular structure.

Described generally, the present invention is directed to measuring the accuracy of precision of the path of a cutting tool of a machine tool guided through an arc having uniform radii by predetermined programs for producing orbicular structures or parts. These machines which have a data input are referred to as programed machines with the program to which the machine responds normally being the locus of the axis of the cutting tool with respect to the workpiece. The program, which may be stored in any suitable well-known form such as punched cards, numerical control tapes, templates, etc., is sensed by appropriate reading systems for advancing the cutting tool and other machine components for generating the desired tool path with respect to an internal or external surface of the workpiece. The present invention provides a mechanism for measuring deviations from the actual cutting-tool path generated with respect to the path the cutting tool should generate in order to follow a path defining a true radius contour, i.e., an arc having uniform radii at arbitrarily selected points on the arc.

Described more specifically, the embodiment of the present invention illustrated in the drawings, particularly FIGS. 1 and 2, is attached to a machine tool shown as a lathe configured for machining the inner contour of an orbicular workpiece (not shown). The lathe normally includes a suitable face plate, or chuck 10, affixed to the machine spindle 12 for supporting and rotating the workpiece and the carriage 14 for supporting a boring bar 16 with a tool holder (not shown) and a tool thereon (not shown) in an operative relationship with the workpiece. In place of the tool holder there is shown a bearing holder or spindle holder 18 for pivotally supporting one end of the measuring mechanism of the present invention, as will be described below. As best shown in FIG. 2 the spindle 12 is adapted for translational displacement along the Y-axis while the carriage 14 is adapted for translational displacement along the X-axis. This translation of the spindle and the tool carriage is accomplished by any suitable mechanism such as by a pair of driving motors 20 and 22 respectively connected to the spindle and tool carriage through a pair of lead screws 24 and 26. The motors 20 and 22 may be of any conventional type normally employed in automated machine tools. These motors are operated by an electronic controller 28 which responds to a prerecorded program contained on an input tape 30. Controller 28 may be of the analog type, i.e., a conventional feedback control system, or it may be of a numerical control system employing a special purpose digital computer. The control tape may be of a magnetic or punched paper type or of any other type compatible with the controller. The apparatus of the present invention for measuring the accuracy of the tool path under the direction of the controller comprises an articulate, two-segment, armlike structure 32 projecting between and mechanically coupling to the face plate, or chuck 10, of the machine spindle 12 and the spindle holder 18 on the cutting tool carriage 14. One segment 34 of the armlike structure 32 is coupled to the other segment 36 and the spindle holder 18 by relative motion means 38 and 40 disposed adjacent to opposite ends of segment 34 for permitting the latter to pivot or rotate without varying the effective length of the segment 34 while at the same time maintaining the longitudinal axis of segment 34 in alignment with the pivotal axis of the tool when affixed to the tool holder and a point constructively defining the pole or the point of the orbicular workpiece remote to the open end or equator of the latter as provided by the pivotal center of the means 38 coupling segment 34 to segment 36. The segment 36 of the armlike structure is, in turn, secured to the chuck 10 by a slide 42 affixed to the latter at a location spaced from the axis of rotation of the spindle. The slide 42 is used to adjust the center of ball 44 in line with sensing means 43 as will be described below. The effective length of segment 34 spanning the distance between the point defining the pole of the workpiece and the pivotal axis of the means 40 coupling the segment 34 to the spindle holder 18 is for the purpose of this description selectively adjustable and made equal to the length of the inner or outer radius of the workpiece but is, in fact, greater or less than the radius of the workpiece, depending on the orientation and the length of the cutting tool extending from the cutting tip thereof to the pivotal axis of the tool projecting through the center of the means 40.

On command and in accordance with the preset program the machine spindle and tool carriage (without rotation of the spindle) are moved along the Y-axis lead screw and the X-axis lead screw, respectively, at predetermined programed speeds so as to cause the spindle holder 18 to trace an arc having an expected common radius while the mechanism of the present invention is attached. However, in practice there are some deviations in the actual tool path from the commanded tool path. In order to measure these deviations a suitable sensing means 43 is operatively associated with segment 34 of the armlike structure. The sensing means 43 detects and measures changes in the effective length of segment 34 with the resulting measurements providing the information indicative of the accuracy or precision of the actual cutting-tool path.

The relative motion means 38 about which the segment 34 pivots or rotates is shown in FIG. 1 comprising at 38 a tooling ball 44 supported on segment 36 by a sleeve 46 which is selectively positionable along the length of segment 36. A locking screw 48 penetrates the sleeve 46 for locking the latter in its desired position on segment 36. The center of the tooling ball provides the point defining the pole of the workpiece. The engagement or contact of segment 34 with the tooling ball may be conveniently provided by an elongated element 50 carried by the segment 34 and having a cup-shaped face conforming to the surface of the tooling ball. This cup-shaped element 50 may be formed of a material exhibiting low friction properties such as polytetrafluoroethylene or nylon. The relative motion means 40 coupling segment 34 to the spindle holder 18 is shown in FIG. 1 comprising an air bearing 52 provided with a suitable air supply (not shown) and affixed to the spindle holder 18 modified to receive the air bearing. A sleeve 54 having a locking screw 56 thereon is carried by the air bearing and encircles the segment 34 so as to provide a mechanism for selectively varying the effective length of segment 34 to the length corresponding to the radius of the workpiece that the tool is programmed to machine.

While the relative motion means 38 and 40 about which the arm 34 pivots are shown as a tooling ball and air bearing, respectively, it is to be understood that other such means may be satisfactorily employed. For example, tooling balls may be employed at both locations. Also, instead of a cup-shaped element a three-point contact at the end of the segment may be employed to provide the engagement with the ball or balls so that regardless of the motions made during the movement of the segment 34, the three-point contact would rotate about each ball without changing the effective length of the segment 34.

In order to assure that the spindle axis of rotation is perpendicular to the plane of machine slide travel the spindle holder 18 may be attached to the boring bar 16 by a flexible coupling containing adjusting screws 58 and 60 which provide for horizontally aligning the sleeve 54 with the segment 34.

The sensing means 43 for detecting and measuring changes in the effective length of segment 34 is preferably a conventional LVDT in which the displacement of a core therein relative to the coil of the transformer generates a signal indicative of the linear displacement of the core. The core 62 of the LVDT is attached to or abuts against the cup-shaped element 50 and penetrates the segment 34 so that any change in the effective length of the segment 34 during the generation of the tool path in accordance with the programmed operation displaces the core 62 relative to the coil of the LVDT to provide an output signal. This signal is amplified in a conventional manner and coupled to a mechanism suitable for recording or otherwise indicating the error between the actual tool path and the programmed tool path. For example, a strip chart recorder shown at 64 in FIG. 2 may conveniently provide the desired recordings. While the LVDT is preferred for measuring the deviations of the actual tool path from the programmed tool path other measuring means such as mechanical dial indicators, read mechanisms, and the like may be employed.

The sensitivity of the measurement by the mechanism of the present invention is in the order of about ±0.01 mil up to ±0.005 mil using an LVDT. However, finer measurements could be made by employing sensing systems more sensitive than LVDT's as are known in the art. Alternatively, if wider tolerances are permissible, a dial gage or the like may be employed in place of the LVDT. If errors in the actual tool path are found to be outside of acceptable tolerances for the workpiece, corrections may be made in the program or the mechanics of the machine.

The apparatus of the present invention may be utilized to measure the accuracy of the tool path when the latter is generating either the inner contour or the outer contour of an orbicular workpiece. For example, in FIG. 2 the effective length of the arm 34 is adjusted by appropriate movement of the sleeves 46 and 54 to correspond to the inner radius of the workpiece. The controller 28 is then energized to effect the translation of the spindle and the tool carriage to generate the tool path in accordance with the program so as to define an arc shown at 66 indicative of the inner contour of a hollow orbicular workpiece. As shown in phantom in FIG. 2 the completion of the measurement is attained when the segments 34 and 36 lie in the same plane in an overlapping relationship with the center of the tool holder in alignment with the axis of rotation of the machine spindle. In FIG. 3 the apparatus of the present invention is shown in use with a machine tool programmed to generate a tool path defining the outer contour of an orbicular workpiece with the effective length of arm 34 adjusted as described above in connection with the FIG. 2 operation. The spindle and carriage are driven through their programmed translation movement to generate an arc shown at 68. With the completion of this arc the spindle and tool carriage are in the positions shown in phantom in FIG. 3.

Alternatively, if only the outer contour of an orbicular workpiece is to be generated by the cutting tool the apparatus of the present invention may be modified so that the armlike structure consists only of a single segment coupled to the spindle at the axis of rotation of the latter by a tooling ball or the like and to the tool holder by a tool ball or an air bearing such as shown at 52. The coupling with the air bearing in this alternative embodiment does not include a sleeve such as at 54 and is displaced 90° from that shown in FIG. 1 so as to maintain the segment in alignment with the centerline of the cutting tool as the machine is passed through its programmed operation.

It will be seen that the present invention provides a mechanism which accurately measures the deviations in the actual path of a cutting tool from the tool path dictated by a program so as to allow machine or program corrections to take place without suffering the shortcomings of such measuring mechanisms heretofore encountered.

What is claimed is:

1. An apparatus for use with a machine tool adapted to machine an orbicular structure of a uniform radius and comprising a rotatable spindle and a tool carriage supporting a tool holder and a cutting tool wherein the path generated by the cutting tool is controlled by a preselected program; said apparatus utilized for measuring deviations of the path actually generated by the cutting tool from a path defining an arc having a uniform radius, comprising relative motion support means disposed in place of said tool holder, a mechanical coupling projecting between and connected to said spindle and relative motion support means with said mechanical coupling having an effective length corresponding to the length of said uniform radius, pivot means intermediate the spindle and the relative motion support means for effecting pivotal movement of said mechanical coupling without varying the effective length of the latter, and sensing means carried by said mechanical coupling for measuring changes in the effective length of the latter as the machine tool is directed through its program with said changes being indicative of said deviations.

2. The apparatus claimed in claim 1, wherein said mechanical coupling comprises an articulate two-segment structure with a first segment secured at one end thereof to said spindle and projecting along a plane parallel to the axis of rotation of said spindle, the second segment is disposed in a plane parallel to said first segment and provides said effective length, and wherein said pivot means intermediate said spindle and said relative motion support means comprise relative motion means disposed adjacent to opposite ends of said second segment for effecting the pivotal movement of the second segment with respect to said first segment and said relative motion support means.

3. The apparatus claimed in claim 2, wherein a sleeve is carried by and selectively positionable on said first segment, said relative motion means disposed adjacent one end of the second segment comprises a ball affixed to said sleeve at a location laterally spaced therefrom and ball contacting means carried by said second segment at said one end thereof for engaging the ball to provide the relative motion between said first segment and said second segment without changing the effective length of the latter.

4. The apparatus claimed in claim 3, wherein a second sleeve is carried by and selectively positionable on said second segment for providing the latter with said effective length, said relative motion means disposed adjacent the other end of the second segment comprises bearing means carried by said relative motion support means, and wherein said second sleeve is secured to said bearing means to provide the relative motion between said second segment and said relative motion support means at a location thereon corresponding to the rotational axis of the cutting tool.

5. The apparatus claimed in claim 4, wherein said bearing means comprises an air bearing, and wherein adjustable means are disposed intermediate said tool carriage and said relative motion support means for vertically orienting the latter.

6. The apparatus claimed in claim 4, wherein said sensing means comprises a linear variable displacement transformer carried by said second segment adjacent said one end thereof, and wherein a core in said transformer is disposed intermediate said ball contacting means and said one end of said second segment and is movable in response to said changes in said effective length of the second segment for providing a signal indicative of said changes.

7. The apparatus claimed in claim 6, wherein recording means are coupled to said transformer for receiving and recording said signal.

\* \* \* \* \*